United States Patent

Wilcox et al.

[11] Patent Number: 6,072,542
[45] Date of Patent: Jun. 6, 2000

[54] AUTOMATIC VIDEO SEGMENTATION USING HIDDEN MARKOV MODEL

[75] Inventors: Lynn D. Wilcox, Portola Valley; John S. Boreczky, San Leandro, both of Calif.

[73] Assignees: Fuji Xerox Co., Ltd., Tokyo, Japan; Xerox Corporation, Stamford, Conn.

[21] Appl. No.: 08/977,808

[22] Filed: Nov. 25, 1997

[51] Int. Cl.[7] .............................. H04N 5/14; H04N 5/222; H04N 5/91; G06K 9/62

[52] U.S. Cl. ........................ 348/722; 348/700; 348/701; 348/722; 382/155; 382/156; 382/157; 382/160; 386/68; 386/69; 386/96; 386/95

[58] Field of Search ..................................... 348/722, 700, 348/701; 382/155, 156, 157, 158, 159, 160, 161; 386/68, 69, 96, 95

[56] References Cited

U.S. PATENT DOCUMENTS

| | | | |
|---|---|---|---|
| 5,649,060 | 7/1997 | Ellozy et al. | 395/2.87 |
| 5,655,058 | 8/1997 | Balasubramanian et al. | 395/2.65 |
| 5,732,146 | 3/1998 | Yamada et al. | 382/107 |
| 5,786,855 | 7/1998 | Chen et al. | 348/391 |
| 5,801,765 | 9/1998 | Gotoh et al. | 348/155 |
| 5,828,809 | 10/1998 | Chang et al. | 386/69 |

Primary Examiner—Michael H. Lee
Assistant Examiner—Paulos Natnael
Attorney, Agent, or Firm—Oliff & Berridge, PLC

[57] ABSTRACT

Detection of video shot boundaries using a Video Segmenting Hidden Markov Model to model the sequence of states of a video. The Video Segmenting Hidden Markov Model determines the state sequence based on feature values. Using Hidden Markov Model techniques allows for automatic learning and use of multiple features including motion vectors, audio differences and histogram differences, without the need for manual adjustments of these thresholds.

17 Claims, 8 Drawing Sheets

MOTION VECTORS

MOTION VECTORS

AUTOMATIC VIDEO SEGMENTATION USING HIDDEN MARKOV MODEL

BACKGROUND OF THE INVENTION

1. Field of Invention

This invention relates to video indexing, archiving, editing and production, and more particularly, to analyzing video content using video segmentation techniques.

2. Description of Related Art

Much information in today's world is captured on video. However, the volume of video sources makes finding a specific video sequence difficult. The time-dependent nature of video also makes it a very difficult medium to manage. Thus, to be a useful information source, the video should be indexed. Indexing can be used to identify shots and sharp breaks and gradual transitions between shots. However, much of the vast quantity of video containing valuable information remains unindexed.

At least part of the reason is that many current indexing systems require an operation to view the entire video sequence and to manually assign indexing to each scene in the video. That is, an operator must view the entire video through a sequential scan and assign index values to each frame of the video. This process is slow and unreliable, especially compared to systems that are used for searching text-based data. Thus, the effective use of video is limited by a lack of a viable system that enables easy and accurate organization and retrieval of information.

Current systems for indexing video can detect sharp breaks in a video sequence, but are generally not effective for detecting gradual transitions between video sequences. These systems use techniques for computing feature values within each frame in a video sequence. The simplest technique is to count the number of pixels that change in value more than some threshold, such as described in Zhang et al., "Automatic Partitioning of Full-motion Video," Multimedia Systems, 1993, Vol. 1, No. 1, pp. 10–28 (hereafter Zhang). Zhang used this technique on smoothed images, and obtained very good results for thresholds tailored to each specific video. Another technique compares images based on statistical properties. For example, Kasturi and Jain, "Dynamic Vision" in Computer Vision: Principles, IEEE Computer Society Press, Washington, D.C., 1991, discloses computing a feature value difference based on the mean and standard deviation of gray levels in regions of the frames.

The most widely used technique for detecting shot boundaries is based on color or gray-level histograms. In this technique, if the bin-wise difference between histograms for adjacent frames exceeds a threshold, a shot boundary is assumed. Zhang used this technique with two thresholds in order to detect gradual transitions.

Arman et al., "Image Processing on Encoded Video Sequences," Multimedia Systems, 1994, Vol. 1, No. 6, pp. 211–219, computed frame-to-frame differences without decompressing images using differences between the discrete cosine transform (DCT) coefficients for adjacent frames. Zabih et al., "A Feature-based Algorithm for Detecting and Classifying Scenes & Breaks," Proc. ACM Multimedia 95, San Francisco, Calif., November 1998, pp. 189–200, discloses comparing the number and position of edges in adjacent frames. Shot boundaries were detected when the percentage of edges entering and exiting between the adjacent frames exceeded a threshold. Dissolves and fades were indexed by looking at the relative values of the entering and exiting edge percentages. Finally, Phillips and Wolf, "Video Segmentation Technologies for News," in Multimedia Storage and Archiving Systems, Proc. SPIE 2916, 1996, pp. 243–251 discloses computing the sums of the magnitudes of the motion vectors within an image, and used these sums alone or with a histogram difference to detect shot boundaries.

One drawback with the above-described techniques is the need for manual threshold selection. Even when done very carefully, this step can introduce errors because of differences between videos. Thus, a threshold selected for one video may not be appropriate for another video. Further, when applied to gradual transitions, this technique makes establishing a threshold even harder because the feature value differences between frames may be very small.

Another problem with current techniques involves feature selection. Many features, such as brightness, work well for classifying sharp breaks or cuts. However, the same feature is often difficult to apply to identifying gradual transitions.

Finally, many video segments could be more accurately identified by applying multiple features to the video segment. However, current techniques do not generally allow use of multiple features.

SUMMARY OF THE INVENTION

This invention provides a system and method that use a Video Segmenting Hidden Markov Model to identify and classify the temporal partitioning of video sequences into individual segments.

The Video Segmenting Hidden Markov Model reliably distinguishes between sharp breaks and gradual transitions. The temporal partitioning begins by training the Video Segmenting Hidden Markov Model of the system and method of this invention on selected videos that have been digitized. Training starts with an operator viewing the video to identify frame numbers corresponding to different states of the video. Standard algorithms are then used to produce feature values for each frame. Then, a distribution is computed for the feature values for each of the states. The distributions of the feature values are used to distinguish between shots, cuts, gradual transitions and other video states.

Once trained on a video, the Video Segmenting Hidden Markov Model of this invention can automatically segment any video sequence. The system and methods of this invention temporally segment any video sequences into individual states including shots, cuts, gradual transitions and shots where camera motion occurs.

Using Hidden Markov Models for video segmentation eliminates at least two problems. First, the Hidden Markov Model of this invention replaces these thresholds with automatically learned parameters for the feature values for detecting cuts and gradual transitions. Second, the Hidden Markov Model allows multiple features, such as histogram differences, motion vectors and audio differences, for example, to be used in the video segmentation. The Video Segmenting Hidden Markov Models of this invention allow any number of features to be included in a feature vector.

These and other features and advantages of this invention are described in or are apparent from the following detailed description of the preferred embodiments.

BRIEF DESCRIPTION OF THE DRAWINGS

The invention is described in detail with reference to the following drawings, wherein like numerals refer to like elements, and wherein.

DETAILED DESCRIPTION OF PREFERRED EMBODIMENTS

An important aspect of video content analysis is the ability to partition a video into component parts, or segments. The segments may include shots, transition states and portions within a shot where camera motion occurs. A shot is a sequence of video frames from a single camera.

Transition states exist between shots. There are a number of different types of transition states between shots. The simplest transition state is a cut. A cut is an abrupt change from one shot to another that occurs over a single frame.

Gradual transition states between shots are more complex. A fade is a slow change in brightness, usually starting or ending with a solid black frame. A dissolve is a gradual transition state between shots in which two or more shots are overlaid. In a dissolve, frames from the first shot become gradually dimmer while frames from the second shot become gradually brighter. Many other types of gradual transitions are possible. Camera motion may include pans and zooms.

In the system and method of this invention, transition states between shots are found by computing values of one or more features of the video and using the values for these features in a model. The feature values can be computed using pixel differences, differences based on statistical properties of pixels, histogram differences, differences based on compression algorithms, edge differences, motion vectors and audio differences. In prior systems, after feature values were computed, a threshold was set. When analyzing a video sequence, if the feature value exceeded the threshold, a shot boundary was declared.

To avoid manual threshold selection and other ad hoc techniques for detecting video states, the system and method of this invention use a Video Segmenting Hidden Markov Model. The Video Segmenting Hidden Markov Model, and Hidden Markov Models in general, have the Markovian property that the conditional distribution of states in the future, given the present state and past states, depends only on the present state and is independent of the past state. That is, a Markov Model, or Markov chain, is a stochastic process that can take on a finite number of possible values, $X_n$, $n \geq 0$. If $X_n = i$, the process is said to be in state i at time n. When the process is in state i, there is a fixed probability $P_{ij}$ that it will next be in state j.

Figure 1:
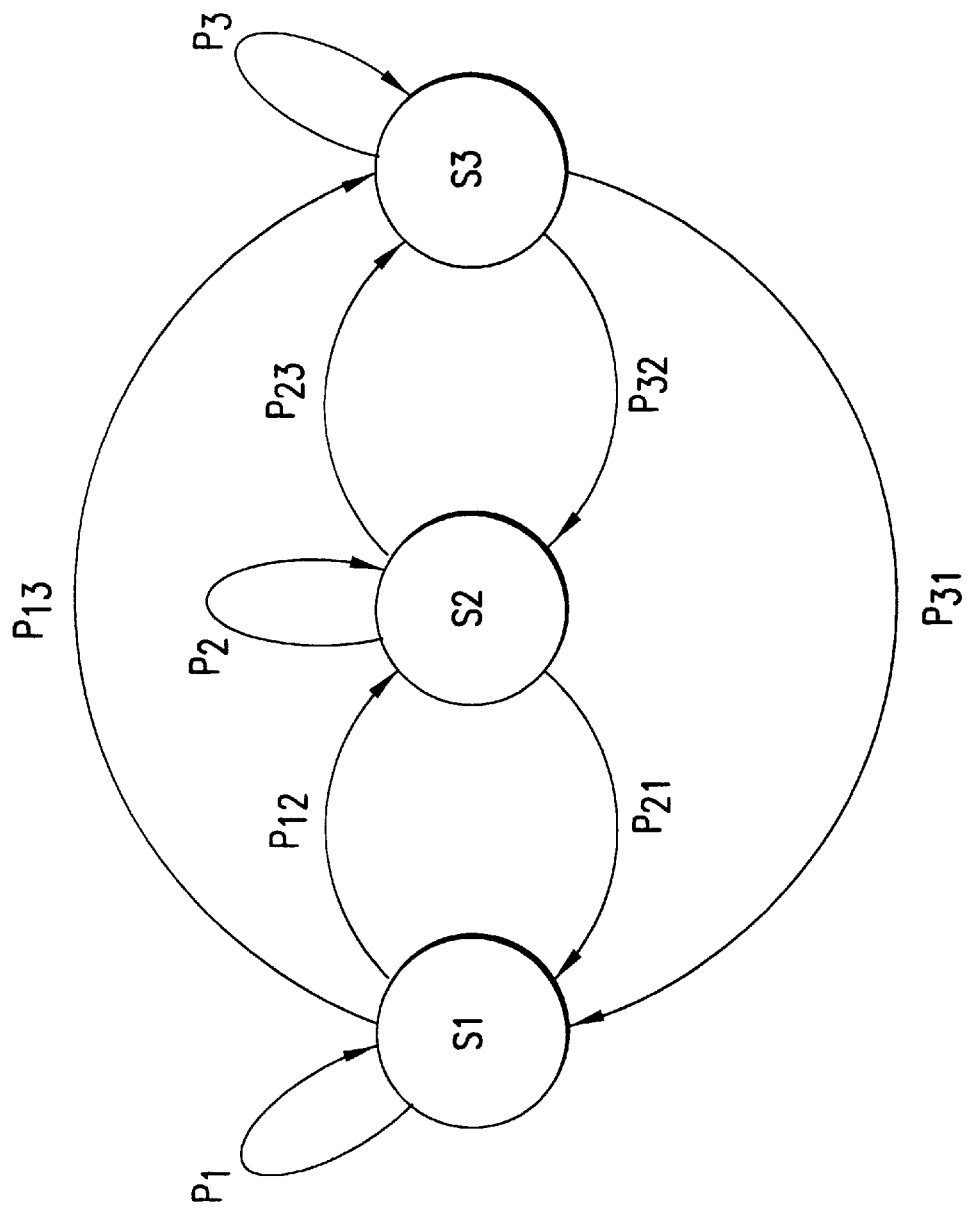
FIG. 1 is a state diagram of a Markov Model.

FIG. 1 shows a generic Markov Model with three states $S_1$–$S_3$. The process shown in the model undergoes changes from one state to another at certain intervals. Thus, there is, for example, a fixed probability $P_{12}$ that the process shown in FIG. 1 will transition from state $S_1$ to state $S_2$.

In a Markov Model, the states are known, or observable. Hidden Markov Models differ from Markov Models in that the state that the Hidden Markov Model is in is unknown, or unobservable. However, it is possible to guess the state of the Hidden Markov Model by computing probability distributions of features within each state and by then inferring the state based on the observed probability distributions. Details for implementing Hidden Markov Models are described in "A Tutorial on Hidden Markov Models and Selected Applications in Speech Recognition," by L. R. Rabiner (hereafter "Rabiner"), incorporated herein by reference in its entirety.

In the method and system of this invention, the states of a Video Segmenting Hidden Markov Model (VSHMM) correspond to the various segments of a video, namely the shots, the portions of the shots where camera motion occurs, and the transitions between shots, including cuts, fades and dissolves. Within each state, the probability distribution is used to model the feature values.

Thus, the probability distribution for the histogram difference feature in the "cut" state would describe the large differences likely to occur between adjacent frames of the two shots. In contrast, the probability distribution for the histogram difference feature in the "shot" state would describe the small differences likely to occur between adjacent frames within a shot. The VSHMM of this invention also contains paths between states showing the allowable progressions of states. Transition probabilities, associated with these paths, may model the length of time spent in a particular state. Thus, the state representing a "cut" would have a short duration, while a "shot" state would have a long duration.

The parameters of the VSHMM of the system and method of this invention, and of Hidden Markov Models in general, that is, the probability distributions for the states and the transition probabilities between states, or to remain in the same state, are learned using training data. The training data may include for the VSHMM the feature values for a video that has been labeled with shots and transition types.

Once the VSHMM is trained, it can be used to segment a video into its component shots and transitions by applying well-known algorithms to determine the most likely sequence of states. The feature values from the video are computed. The sequence of states most likely to have generated this sequence of feature values is determined. The resulting sequence of states, including shots, cuts, fades, dissolves and camera motions, defines the different segments of the video.

Figure 2:
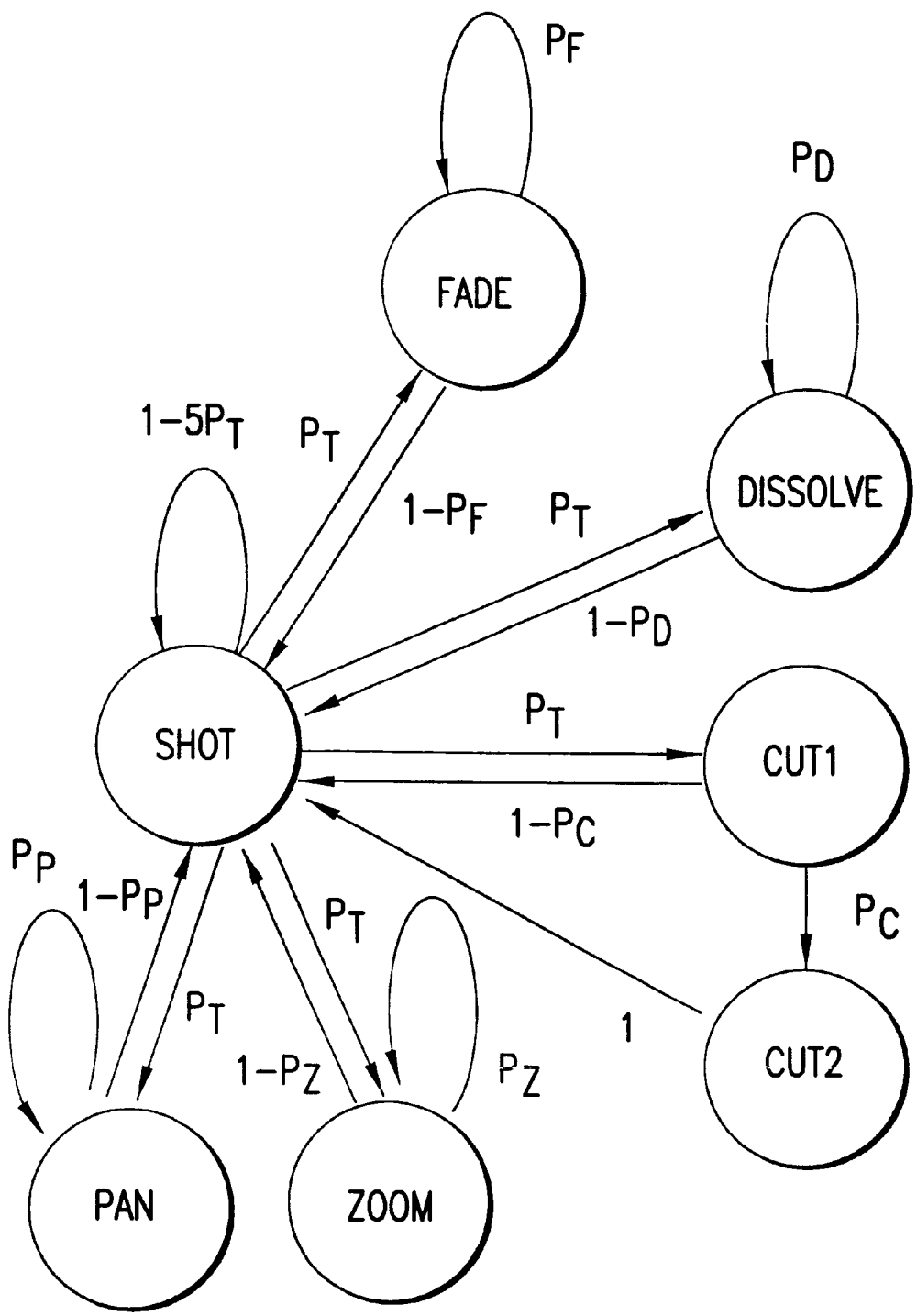
FIG. 2 is a state diagram of one embodiment of the Video Segmenting Hidden Markov Model of this invention.

To construct an embodiment of the VSHMM, the operator must decide which states will be included in the particular embodiment. The operator then defines the transitions between states. FIG. 2 shows the structure of one embodiment of the VSHMM of the system and method of this invention. The VSHMM shown in FIG. 2, which will be described in more detail later, has six states with allowed transitions between states.

As noted above, to begin the process of segmenting a video, the VSHMM (VSHMM) must first be trained. The labeling process begins when an operator views the digitized video on a computer display, for example. Because the video is now digital, each frame is encoded separately. This makes it possible to more easily identify boundaries between different states. That is, because the frames are separately encoded, the operator can scroll forward and backward through the video to find the exact frame that the operator believes defines the boundary of the state. The operator then views the entire video and manually assign labels to portions of the video. For example, frames 10 to 100 might be labeled as a shot, and frames 101 to 112 might be labeled as a dissolve. When the entire video has been viewed and labeled by the operator, the previously constructed VSHMM can be trained.

Well-known processes can then be used to compute feature values in each frame of the labeled videos. For example, if the feature is brightness histogram difference, well-known techniques are available to construct a histogram of the brightness in each pixel of the frame, and from that compute frame-to-frame differences. The feature values for other features, such as, for example, audio differences and camera motion, can also be developed using other processes.

Within a particular state, such as a shot, although there might be variations in any feature value, the feature value variations across states for that feature are likely to be even larger. For example, the variation in brightness within a shot is generally not as large as the variation in brightness that occurs between the last frame of a shot and, for example, the frame of a "cut" transition. This fact can then be used by the VSHMM to classify, or segment, a video according to its features. The process for segmenting a video will be described later.

Another aspect of the VSHMM that allows accurate segmenting of a video is that the feature value variations that are observed for one type of video are similar to the feature value variations that would be observed for another type of video. Thus, the feature values of the histogram difference feature for a feature movie will be similar to the values of the same feature observed in, for example, a cartoon or a music video. Thus, by determining the feature value distributions for any feature from a training corpus of a few videos, the VSHMM can be trained to accurately segment any video.

The VSHMM also relies on the fact that each of the different states of the video, that is, the shots, cuts, dissolves, fades and camera motions, will tend to have different distributions of feature values. Thus, the feature values in brightness for a cut will tend to be different than for, for example, a dissolve.

Three features used by the VSHMM are a gray-level histogram difference, a motion estimator (motion vector difference) and an audio difference. The histogram feature $F_H$ is simple, easy to compute and works well for most types of video. The histogram feature $F_H$ is well known to those skilled in the art and need not be described in detail here. Basically, as shown by Equation (1), $F_H$ is computed as:

$$L_{PIXEL} = 0.3008(R) + 0.5859(G) + 0.1133(B)$$

$$H[k] = \# \text{ of pixels}$$

where $k = L_{PIXEL}/4$, $0 \leq k \leq 63$ $$F_H = \Sigma |H[k] - H_{PIXEL}[k]|, \quad (1)$$

$0 \leq k < 63$
where:

$L_{PIXEL}$ is the luminance of a pixel in the range 0–255 based on the 8-bit (256 value) red, green and blue components;

H is a 64-bin histogram computed by counting the number of pixels in each bin of 4 adjacent gray levels; and $F_H$ is the absolute bin-wise difference of the histograms of adjacent frames.

Figure 3:
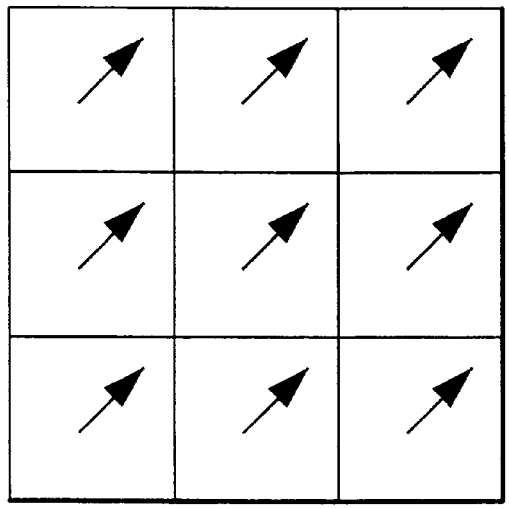
FIG. 3 shows motion vectors during a pan.

The presence of motion is detected using two motion features computed from the coherence of motion vectors of nine, evenly-distributed blocks in each frame. The first feature is the magnitude of the average of the nine motion vectors. The second feature is the average magnitude of the nine motion vectors. The combination of these two motion features allows the VSHMM to detect pans and zooms. For example, when both motion features have a high value, a pan is indicated. When the first feature is small and the second feature is large, a zoom is indicated. When the second feature is small, no camera motion is indicated. FIG. 3 shows a sample of motion vectors that indicate a pan. In FIG. 3, the magnitude of the average vector is high, for example, 10 pixels, and the average magnitude is 10 pixels.

Figure 4:
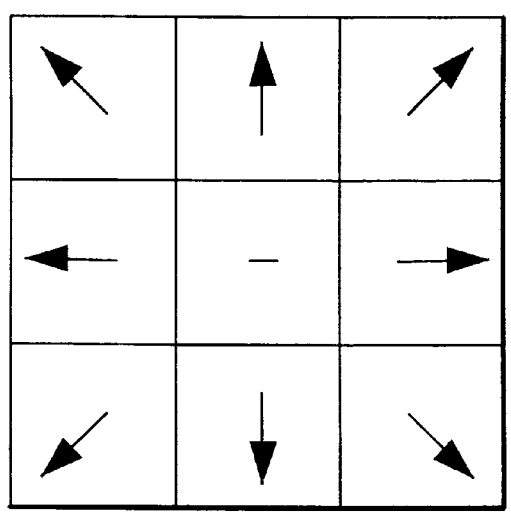
FIG. 4 shows motion vectors during a zoom.

FIG. 4 shows a sample of motion vectors that indicate a zoom. In FIG. 4, the magnitude of the average vector is zero because opposing vectors cancel. The average magnitude is 9 pixels.

Figure 5:
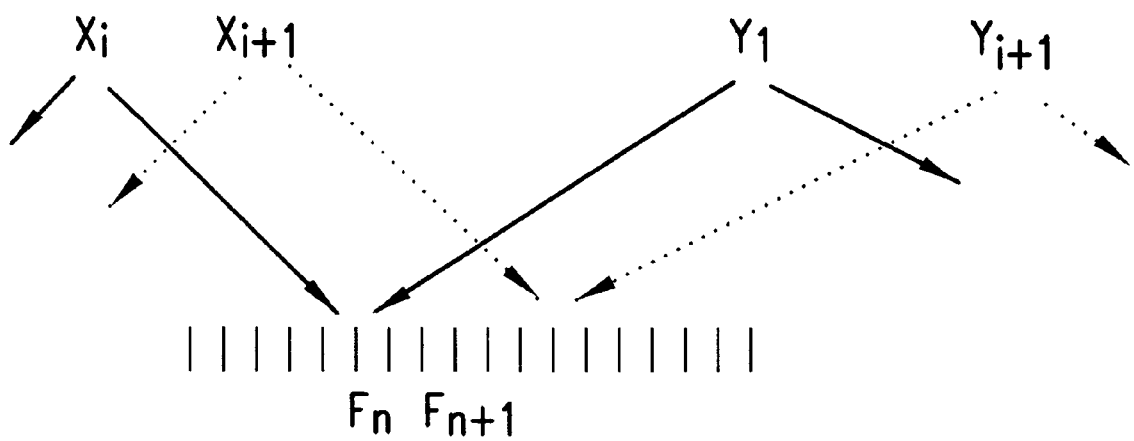
FIG. 5 shows sampling of adjacent frames of a video.

The audio difference feature used by the VSHMM is similar to the likelihood ratio described in U.S. Pat Nos. 5,659,662 and 5,598,507. This difference is computed between two adjacent intervals of audio X and Y as shown in FIG. 5. In order for this distance to accurately reflect differences in the type of audio (speech, silence, etc.) it is necessary to use a relatively long interval, such as, for example, a two-second window. This is because speech is composed of short (approximately 30 milliseconds (ms)) intervals containing either silence, periodic voiced signal (typically vowels), or noise. Silence can also appear as pauses in speech. Thus, using too-short analysis windows for audio could show erroneously large differences in purely speech audio.

Audio is first converted to a sequence of 12-dimensional cepstral vectors $v_i$, computed every 20 ms. Thus the two-second interval X consists of a sequence of 100 cepstral vectors $X = (v_1, \ldots, v_{100})$. If X and Y are two such intervals, then Z is the four-second interval obtained by concatenating X and Y, i.e., $Z = (X,Y)$.

The audio distance measure is similar to the likelihood ratio measure used in the previously mentioned patents. Let $H_o$ denote the hypothesis that X and Y are the same audio type, and let $H_1$ denote the hypothesis that they are different types of audio. $L(X:\theta_x)$ is the likelihood of the X interval. The cepstral vectors in the interval are assumed to be independent, and are characterized by a Gaussian mixture distribution consisting of 16 mixtures. Then, $\theta_x$ represents the parameters of this distribution, namely the 16 mixtures, the 12-dimensional mean vector, and the covariance matrix, which is assumed to be diagonal. $L(Y:\theta_y)$ and $L(Z:\theta_z)$ are defined similarly.

Then, the likelihood $L_1$ that the two intervals are different audio types is:

$$L_1 = L(X:\theta_x)L(Y:\theta_y).$$

The likelihood that the two intervals are the same audio type is:

$$L_0 = L(Z:\theta_z).$$

Thus the likelihood ratio for testing the hypothesis that the intervals represent the same sound type is:

$$\lambda_L = L_0/L_1.$$

This ratio is large when $H_0$ is true, that is when X and Y have the same statistics, and small otherwise. Thus, the distance measure between intervals X and Y is set to:

$$d(X,Y) = -\log(\lambda_L),$$

which is large when X and Y are different.

The audio feature is computed at a rate of 5 times per second by sliding the intervals shown in FIG. 5 by 10 cepstral vectors. Since the video difference is computed 30 times per second, each audio distance is replicated 6 times so that the audio feature is computed at the same rate.

The audio difference feature helps reduce errors when identifying transition states. For example, in a shot, the histogram feature would normally show small values. However, in some shots, such as those showing an explosion or some other sudden, bright event, the value of the histogram feature may be large enough to indicate that a cut occurred. To prevent this type of erroneous identification of a transition state, the VSHMM may include the audio difference feature.

The features used in the VSHMM, the histogram difference feature, the motion vector feature and the audio difference feature, are modeled with state-dependent Gaussian mixture distributions. Standard algorithms are then used to train the VSHMM with a corpus of video segments labeled with shots, transition states, camera motion.

The training process estimates the parameters of the Gaussian mixture distributions, given the features computed for the training data. That is, once the video has been manually labeled, and an algorithm run to determine the feature values, the training process estimates the Gaussian mixture distributions for each of the VSHMM states. Thus, the training process, using standard algorithms, computes the mean and the variance of each state conditional distribution.

In addition to determining the Gaussian mixture distribution of features in the states, the training process may also compute the probability of moving from one state to another. However, if the probabilities of moving from state to state are the same, any bias toward assuming a particular state is eliminated. This helps make the VSHMM more useful for segmenting a variety of different video types. For example, a music video may have many more fades and dissolves than a feature movie. Thus, the probability of being within a cut in a feature movie would be higher than the probability of being within a cut in a music video.

To segment a video, the video must first be digitized. The video is then processed to compute the feature values for the video. Preferably, the feature values are determined at the same rate as the frame rate of the video, although the feature values do not have to be determined at the frame rate. The processing is the same as noted above for processing a video for training the VSHMM. That is, the video is run through a feature extractor, which computes feature values. The features are then fed into the VSHMM.

The VSHMM determines which state a series of frames corresponds to, by in part comparing the features with the Gaussian mixture distributions for each of the states. That is, the VSHMM attempts to determine the most likely sequence of states that match the features. Thus, if there are low values in the histogram difference feature, the VSHMM might classify the frames as part of a shot. However, if the values of the histogram difference feature are larger, the frames may correspond to a transition from a shot to a dissolve, for example. Thus, the VSHMM may determine that the state of the video has changed from a shot to a dissolve.

However, the VSHMM also takes into account the probability of moving from one state to another state. For example, if the probability of moving from a shot to a dissolve is low, and the values of the histogram difference feature suggest a dissolve, the VSHMM considers both probabilities before segmenting the video into a shot and a dissolve.

If the probability of moving to another state is high, the VSHMM is more likely to match one of the other states to the set of feature values. Thus, the VSHMM compares the joint probability of remaining in a particular state and the probability that the distribution of feature values correspond to the particular state to the joint probability of moving to each of the other states allowed by the model structure and the probability that the feature values for that frame correspond to the new state.

Thus, the VSHMM determines the optimal sequence of states, based on a best-fit criteria. The output of the VSHMM process is a video that has encoded onto the frames the different states. Once the states have been determined using the VSHMM, an operator can quickly move to the video segment that contains the desired information.

To find the best state sequence, the VSHMM uses a standard algorithm, such as the Viterbi algorithm. Using the Viterbi algorithm in conjunction with Hidden Markov Models is described in Rabiner, and need not be repeated in detail here. Basically, the Viterbi algorithm finds the single best state sequence and a given model.

In another aspect of the invention, the VSHMM computes the joint probability of more than one feature. For example, during the training process, the VSHMM may compute Gaussian mixture distributions for multiple features. When segmenting a video, the VSHMM may then compare the Gaussian distributions for each feature developed during the training phase to the features for the video being segmented. Assuming the features are independent, the VSHMM will then compute a joint probability by forming the product of the individual feature probabilities. The VSHMM will then segment the video based on these joint probabilities and the probability of moving from one state to another state.

FIG. 2 shows a six-state VSHMM of the system and method of this invention. The "shot" state models frames of the video within a single shot. The other states model the transitions between shots. The transitions include cuts, fades and dissolves. However, other types of transitions can be modeled. Also included are states for camera motion within a shot. Camera motion includes pans and zooms. The paths between states model the allowable progression of the states. Thus, from the "shot" state, it is possible to go to any of the transition states or to remain in the shot state. From the various transition states it is only possible to return to the "shot" state or to remain in the transition state. This assures that only a single transition occurs between shots. The paths from a state to itself model the length of time in that particular state.

A probability is associated with each of the transitions between states. The probability $P_T$ is a probability that a transition occurs. Each transition type, that is, cuts, fades and dissolves, may be given an equal probability of occurring. However, the probabilities for different transition types need not be the same. However, by making the transition probabilities between the states uniform, the distribution of states is determined by the test data and not by heuristics built into the model.

As shown in FIG. 2, the probability 1–5 $P_T$ is the probability of staying in a shot. The probability $P_F$ is the probability of staying in the fade state, and models the duration of a fade. The probability $1-P_F$ is the probability of returning from the "fade" state back to the "shot" state. The probability $P_D$ is the probability of staying in the "dissolve" state, and models the duration of a dissolve. The probability $1-P_D$ is the probability of returning from the "dissolve" state back to the "shot" state. The probability $P_C$ is the probability of moving from the "cut1" state to the "cut2" state, and models the duration of a cut.

The probability $1-P_C$ is the probability of returning from the "cut1" state to the "shot" state. The probability $P_Z$ is the probability of staying in the "zoom" state during a zoom. The probability $1-P_Z$ is the probability of returning to the shot state. The probability $P_P$ is the probability of staying in the "pan" state during a pan. The probability $1-P_P$ is the probability of returning to the "shot" state.

The VSHMM shown in FIG. 2 has two cut states. The VSHMM includes these two states because, assuming the feature values are determined on a frame-by-frame basis, when an analog video is digitized, the resulting cuts may fall across two frames. Then, instead of one large value for the histogram difference feature, there are two slightly smaller adjacent values for the histogram difference feature. The VSHMM might then incorrectly classify the video in the frames as a fade or dissolve, because these states typically have longer durations. Having the second cut state built into the VSHMM can reduce this type of error.

Each state of the VSHMM has an associated probability distribution that models the feature values for that state. The probability distributions can be, for example, Gaussian distributions or Gaussian mixture distributions. The mean and variance of the distributions differentiate between the states. For example, in the shot state, the mean of the values of the histogram difference feature is small, while in the cut state the mean of the values of the histogram difference feature is large.

As noted above, the parameters of the VSHMM, that is, the feature value distributions as well as some transition probabilities, are learned during the training phase. Data for training includes the feature values, for a corpus of labeled video segments. Given this data, a standard algorithm for training the VSHMM parameters, such as the Baum-Welch reestimation algorithm, is applied. The Baum-Welch reestimation algorithm is described in Rabiner. Techniques, such as the expectation-maximization technique (see Rabiner) may also be used. A sufficient amount of data, in terms of both quantity and variety should be used in training the VSHMM so that the resulting parameters can be applied to any video sequence.

Figure 6:
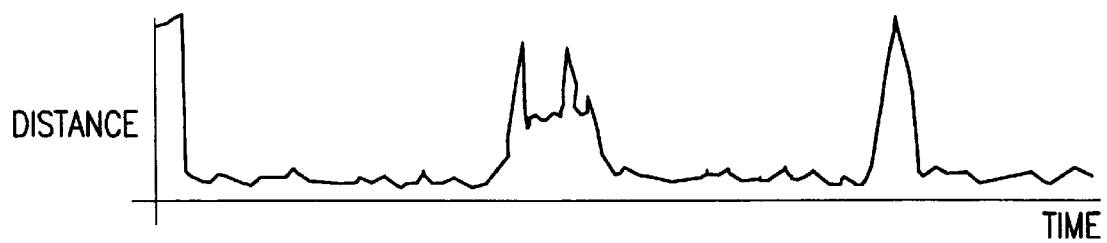
FIG. 6 is an example of a histogram frame-to-frame difference as a function of time.
Figure 7:
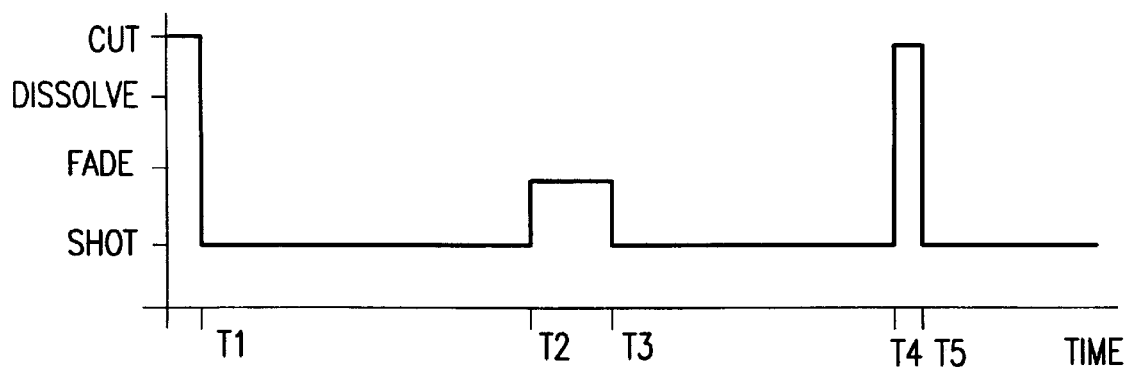
FIG. 7 is the optimal sequence of states based on FIG. 6.

Once the VSHMM is trained, segmenting the video into its shots and different camera motions and transitions is performed using the Viterbi algorithm. Given a sequence of features, the Viterbi algorithm produces the sequence of states most likely to have generated these features. The state sequence is time-aligned with the feature sequence so that the video is segmented according to the times corresponding to the shots, cuts, fades, dissolves, pans and zooms. FIGS. 6 and 7 show an example of video segmentation. In FIG. 6, a frame-to-frame difference, as the histogram difference feature, is shown as a function of time. The differences could also be expressed as a function of the frame number. The large differences correspond to transitions between shots.

FIG. 7 shows the optimal sequence of states, as determined by the Viterbi algorithm for the VSHMM, based on the frame-to-frame difference feature shown in FIG. 6. At time T1, the video changes from the "cut" state, having a large frame-to-frame difference, to the "shot" state, having a small frame-to-frame difference. Between times T2 and T3, the video is in the "fade" state, with corresponding intermediate and high frame-to-frame differences. The video then returns to the "shot" state, with a cut occurring between times T4 and T5.

Figure 8:
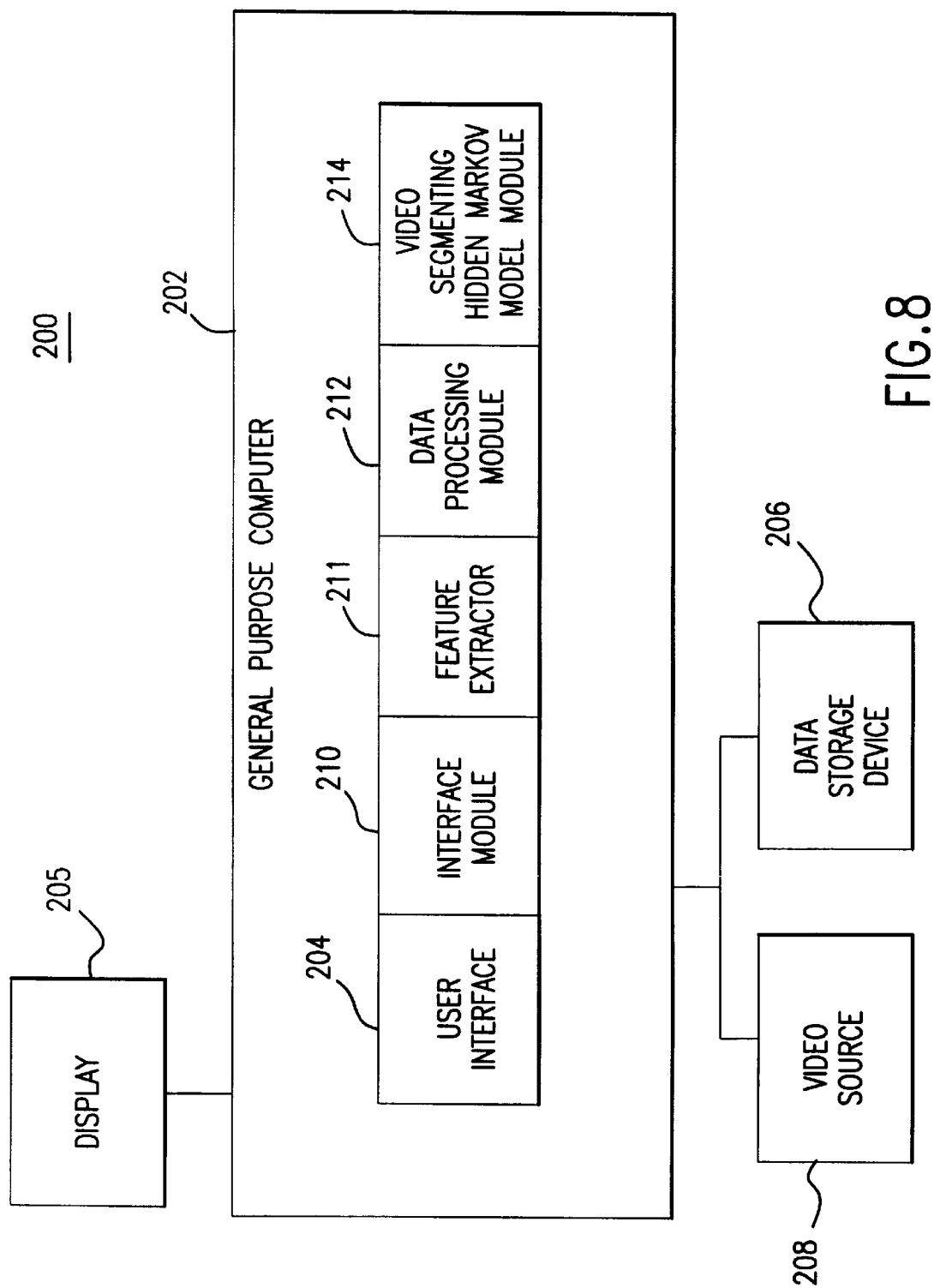
FIG. 8 shows one embodiment of an apparatus for implementing video segmentation using the Video Segmenting Hidden Markov Model of this invention.

FIG. 8 shows a video segmenting system 200 that segments videos using the VSHMM. A user interface 204 allows an operator to make inputs to and receive outputs from the computer 202. Also connected to the computer 202 is a video source 208 that inputs digitized videos. A data storage device 206 stores data related to the VSHMM. The computer 202 includes an interface module 210 that translates inputs from the user input through the user interface to the computer 202 and outputs from the computer 202 to the user.

A display 205 allows the user to receive status reports from the computer 202 related to the training and segmenting processes. The computer 202 also includes a feature extractor 211 that determines feature values for all features selected for the model. A data processing module 212 is used to process the digitized video that has had its features extracted. The VSHMM module 214 contains the statistical data related to the trained VSHMM. The VSHMM module 214 also contains the Baum-Welch reestimation and Viterbi algorithms.

Figure 9:
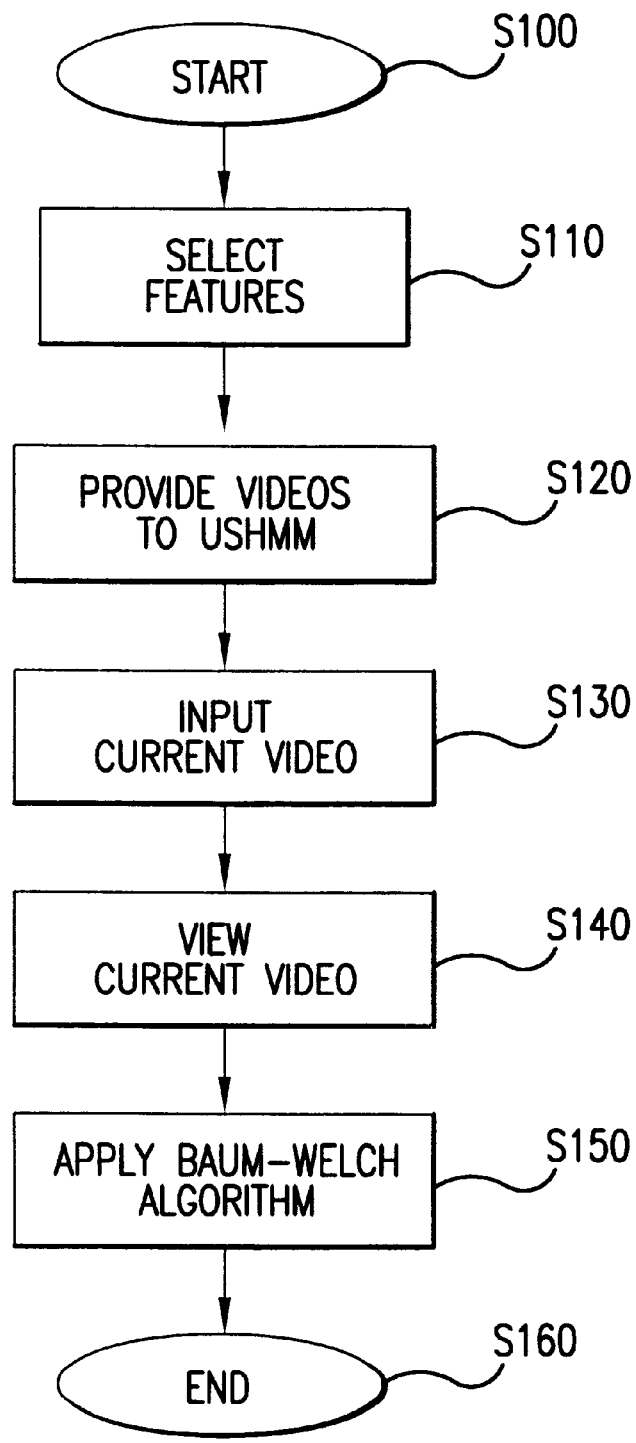
FIG. 9 is a flow chart outlining one embodiment of the method for training the Video Segmenting Hidden Markov Model of this invention.

FIG. 9 is a flow chart outlining one embodiment of a method for training the VSHMM using one or more digitized videos. It should be appreciated that the VSHMM must have already been constructed as outlined above. That is, the operator has already determined the states of the VSHMM and the allowed transitions, and possibly assigned probabilities to the transitions. The operator also selects the features to be used by the VSHMM. The model structure and the selected features are then stored into the VSHMM module 214.

Starting from step S100, the control system continues to step S110, where the set of features to be used to train the VSHMM is selected. Then, in step S120, a corpus of processed training videos having the selected set of features is provided to the VSHMM. Next, in step S130, a current one of the processed training videos is input to the VSHMM.

In step S140, the video is viewed, frame-by-frame, and states are manually assigned to sequences of the frames. The assigned states and corresponding frame sequences are stored in, for example, the data storage device 206. Then, the selected features for this corpus are extracted from each frame of each video. This is done until all video has been labeled. Steps S130 and S140 are repeated for each processed training video.

In step S150, the labeled frames for each labeled video created in step S140 are used by the Baum-Welch training algorithm to estimate the probability parameters of the various states and transitions of the VSHMM. The training process then ends at step S160.

Figure 10:
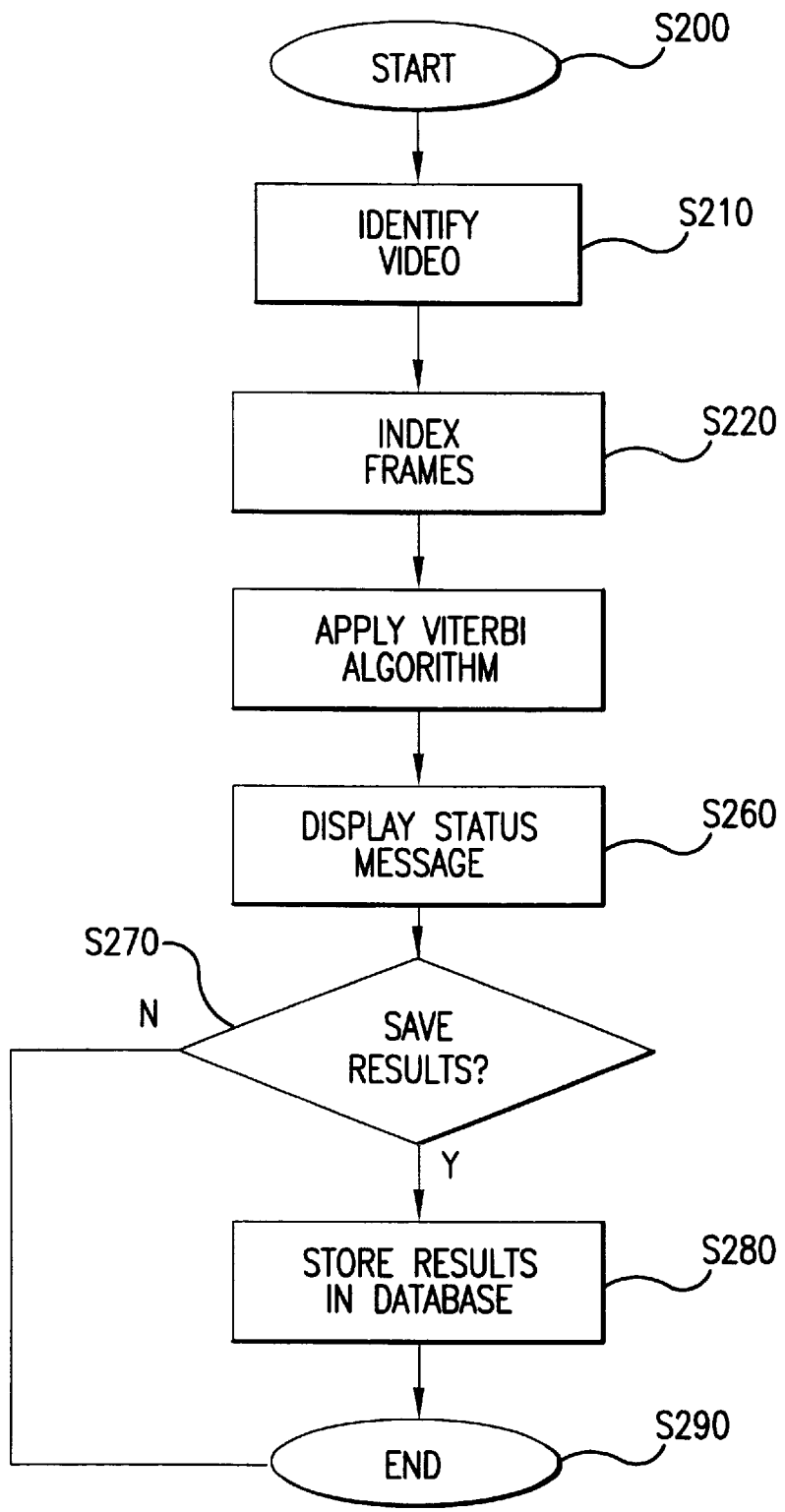
FIG. 10 is a flow chart outlining one embodiment of the method for segmenting the video using the Video Segmenting Hidden Markov Model of this invention.

FIG. 10 is a flow chart outlining the process for automatically segmenting a video using the VSHMM. Starting in step S200, the control routine continues to step S210, where the operator is prompted to identify a video for segmentation. Then, in step S220, the frames are indexed and the features required by the VSHMM are extracted. For example, the feature extractor 211 extracts brightness values for each pixel in each frame and generates a brightness difference histogram feature.

Next, in step S250, the single best state sequence is located based on the observed features. The Viterbi algorithm is preferably used to locate the best state sequence.

In step S260, the operator is notified that the video processing is complete. For example, the computer 202 notifies the operator by displaying a status message to the operator on the display 205. Then, in step S270, the operator is prompted to store the results of the video segmentation. If the operator elects to store the results, control continues to step S280. Otherwise, control jumps directly to step S290. In step S280, the results of the video segmentation are saved in the data storage device 206. The process then continues to step S290, where the control routine ends.

As shown in FIG. 8, the video segmenting system implementing the VSHMM is preferably implemented on the programmed general purpose computer 202. However, the video segmenting system can also be implemented on a special purpose computer, a programmed microprocessor or microcontroller and peripheral integrated circuit elements, an ASIC or other integrated circuit, a hardwired electronic or logic circuit such as a discrete element circuit, a programmable logic device such as a PLD, PLA, FPGA or PAL, or the like. In general, any device on which a finite state machine capable of implementing the flow charts shown in FIGS. 9 and 10 can be used to implement the video segmenting system.

The invention has been described with reference to the preferred embodiments thereof, which are illustrative and not limiting. Various changes may be made without departing from the spirit and scope of the invention as defined in the following claims.

What is claimed is:

1. A method for segmenting a video, comprising:

extracting at least one feature from the video;

comparing the at least one extracted feature to a model having a plurality of states;

inferring a sequence of the states of the video, based on the comparison of the at least one extracted feature and the states and probabilities of moving between the states; and segmenting the video based on the inferred sequence of states.

2. The method of claim 1, wherein a plurality of features are extracted from the video, the plurality of extracted features being compared to a corresponding plurality of model parameters of the states of the model, the extracted features and the model parameters being independent of each other.

3. The method of claim 2, wherein the sequence of states is inferred based on finding a best-fit between the extracted features and the model parameters and the probabilities of moving between the states.

4. The method of claim 1, wherein the states include shots, transition states and camera movement states.

5. The method of claim 4, wherein the probabilities of moving between the states are equal, for all states.

6. The method of claim 4, wherein the transition states comprise cuts, fades and dissolves and wherein the camera motion states comprise shots with pans and zooms.

7. The method of claim 1, wherein the features comprise gray-level histogram difference levels, motion vectors and audio differences.

8. A method of training a video segmenting model comprising:

indexing a training video;

manually assigning boundaries to states of the training video, the states comprising shots, camera motion and transition states;

extracting at least one feature from the training video;

determining feature values for the at least one feature; and computing distributions of the feature values.

9. An apparatus for segmenting a video into states, comprising:

an input device that inputs a digitized video;

a processor, coupled to the input device, that processes the digitized video to extract a feature value and to produce a distribution of the feature value; and a module that segments the digitized video given a set of feature values and a video segmenting hidden markov model.

10. The apparatus of claim 9, wherein the processor extracts a plurality of features, and produces a corresponding plurality of distributions, and wherein the processor determines the best fit based on the plurality of features.

11. The apparatus of claim 10, wherein each of the features are independent from the other features.

12. The apparatus of claim 9, wherein transition probabilities are equal, for all movement among the states.

13. A data structure residing in a memory, the data structure comprising:

a model having a plurality of states;

a first probability associated with each state for each of the at least one feature;

second probabilities associated with moving among the plurality of states; and an algorithm for determining an optimum sequence of states, based on observed feature values for the at least one feature and the first probabilities associated with the states, and the second probabilities wherein the model is used to segment a video into a sequence of states.

14. The data structure of claim 13, wherein the states comprise cuts, fades, dissolves, shots, pans and zooms.

15. The data structure of claim 14, wherein the algorithm determines the optimum sequence of states based on the probabilities associated with the states for a plurality of features.

16. The data structure of claim 15, wherein the features comprise gray-level histogram difference levels, motion vectors and audio differences.

17. The data structure of claim 13, wherein the probabilities are equal for all movement along the states.

* * * * *